United States Patent
Levkova et al.

(10) Patent No.: US 10,068,140 B2
(45) Date of Patent: Sep. 4, 2018

(54) SYSTEM AND METHOD FOR ESTIMATING VEHICULAR MOTION BASED ON MONOCULAR VIDEO DATA

(71) Applicants: Bayerische Motoren Werke Aktiengesellschaft, Munich (DE); NAUTO, Inc., Palo Alto, CA (US)

(72) Inventors: Ludmila Levkova, Brooklyn, NY (US); Koyel Banerjee, Mountain View, CA (US)

(73) Assignees: Bayerische Motoren Werke Aktiengesellschaft, Munich (DE); NAUTO, Inc., Palo Alto, CA (US)

( * ) Notice: Subject to any disclaimer, the term of this patent is extended or adjusted under 35 U.S.C. 154(b) by 70 days.

(21) Appl. No.: 15/367,993

(22) Filed: Dec. 2, 2016

(65) Prior Publication Data
US 2018/0157918 A1 Jun. 7, 2018

(51) Int. Cl.
H04N 7/18 (2006.01)
G06K 9/00 (2006.01)
G06T 7/20 (2017.01)

(52) U.S. Cl.
CPC ........ G06K 9/00791 (2013.01); G06T 7/2006 (2013.01); *G06T 2207/10004* (2013.01); *G06T 2207/20084* (2013.01); *G06T 2207/30252* (2013.01)

(58) Field of Classification Search
CPC .................. G06K 9/00791; G06T 2207/20084
See application file for complete search history.

(56) References Cited

U.S. PATENT DOCUMENTS

| | | | |
|---|---|---|---|
| 9,443,320 | B1 | 9/2016 | Gaidon et al. |
| 2004/0047470 | A1 | 3/2004 | Candelore |
| 2013/0335553 | A1 | 12/2013 | Heger et al. |
| 2015/0006443 | A1 | 1/2015 | Rose et al. |
| 2015/0274161 | A1 | 10/2015 | Stierlin |
| 2015/0306761 | A1 | 10/2015 | O'Connor et al. |
| 2016/0034810 | A1 | 2/2016 | Hershey et al. |
| 2016/0094964 | A1 | 3/2016 | Barfield, Jr. et al. |
| 2017/0312614 | A1* | 11/2017 | Tran .................. G06F 1/163 |

OTHER PUBLICATIONS

PCT/US2017/064234, International Search Report (PCT/ISA/220 and PCT/ISA/210) dated Feb. 23, 2018, enclosing Written Opinion of the International Searching Authority (PCT/ISA/237) (Eight (8) pages).
Konda et al., "Learning to encode motion using spatio-temporal synchrony", Feb. 10, 2014, URL: https://arxiv.org/pdf/1306.3162.pdf, 9 total pages.

* cited by examiner

*Primary Examiner* — Young Lee
(74) *Attorney, Agent, or Firm* — Crowell & Moring LLP

(57) ABSTRACT

A vehicle movement parameter, such as ego-speed, is estimated using real-time images captured by a single camera. The captured images may be analyzed by a pre-trained convolutional neural network to estimate vehicle movement based on monocular video data. The convolutional neural network may be pre-trained using filters from a synchrony autoencoder that were trained using unlabeled video data captured by the vehicle's camera while the vehicle was in motion. A parameter corresponding to the estimated vehicle movement may be output to the driver or to a driver assistance system for use in controlling the vehicle.

11 Claims, 4 Drawing Sheets

SYSTEM AND METHOD FOR ESTIMATING VEHICULAR MOTION BASED ON MONOCULAR VIDEO DATA

FIELD OF THE INVENTION

The present invention relates generally to the estimation of parameters of vehicular motion based on monocular video data from a single camera, unlike the currently popular dual camera/stereo estimation techniques.

BACKGROUND OF THE INVENTION

In recent years there has been a resurgence in the field of artificial intelligence ("AI"), with a rising trend of its application to automotive. However, one of the main obstacles facing the integration of proper AI systems into vehicles is undoubtedly the cost and complexity of the hardware which is required to analyze and process the abundance of raw data in real-time—a mandatory requirement in such applications. While there has been a lot of advancement with regard to GPU technologies to facilitate backend training of huge neural networks on big data, the installation of such costly and sophisticated hardware inside the vehicle is not yet commercially viable.

However, the known AI approaches still have several drawbacks which make their implementation in certain applications infeasible. Despite the huge success of Convolutional Neural Networks (CNNs), their primary dependence on learning from large amount of data points (for e.g., 1 mil.), their lengthy training times, computational cost and complexity are all big overheads when integrating such systems into the automotive. So far CNNs which are used to estimate motion employ stereo feeds, which delays the inference time, increases the computational burden and general cost. It also might be a design challenge to implement 2 cameras instead of 1. In the case of vehicle implementation, an additional design difficulty may arise when GPUs are necessary. The GPUs, which are standard machines on which to run a CNN job, require complex cooling systems for the heat they generate while consuming significant amount of power in an automotive environment. For example, a simple Intel ROS PC, weighing 12 kg, draws 300 W of power and is already pushing the feasibility limit when used in a car. Therefore, there is a need in the art for a system which is much simpler, yet equally or more accurate, with a much faster computation time, lower power consumption, running on low grade hardware and which would not add much to the cost or heating overheads of a commercial vehicle.

SUMMARY OF THE INVENTION

Disclosed and claimed herein are systems and methods for estimating vehicular motion based on monocular video data by encoding spatio-temporal motion features. In one embodiment, the system for estimating vehicular speed includes a camera mounted to a vehicle and configured to capture monocular video data, a memory configured to store data and processor-executable instructions, and a processor configured to execute the processor-executable instructions. In one embodiment, the processor is configured to receive, from the camera, pre-training video data captured while the vehicle is in motion, train one or more filters of the synchrony autoencoder using the pre-training video data, and pre-train the convolutional neural network using the trained one or more filters from the synchrony autoencoder.

Following the pre-training of the convolutional neural network, the processor is further configured to receive real-time video data from the camera while the vehicle is in motion, provide the real-time video data to the pre-trained convolutional neural network, receive an estimated vehicle movement parameter from the pre-trained convolutional neural network, and output the estimated vehicle movement parameter to at least one of an audio/visual system and a driver assistance system of the vehicle.

Other aspects, features, and techniques of the invention will be apparent to one skilled in the relevant art in view of the following description of the exemplary embodiments of the invention.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE EXEMPLARY EMBODIMENTS

Figure 1:
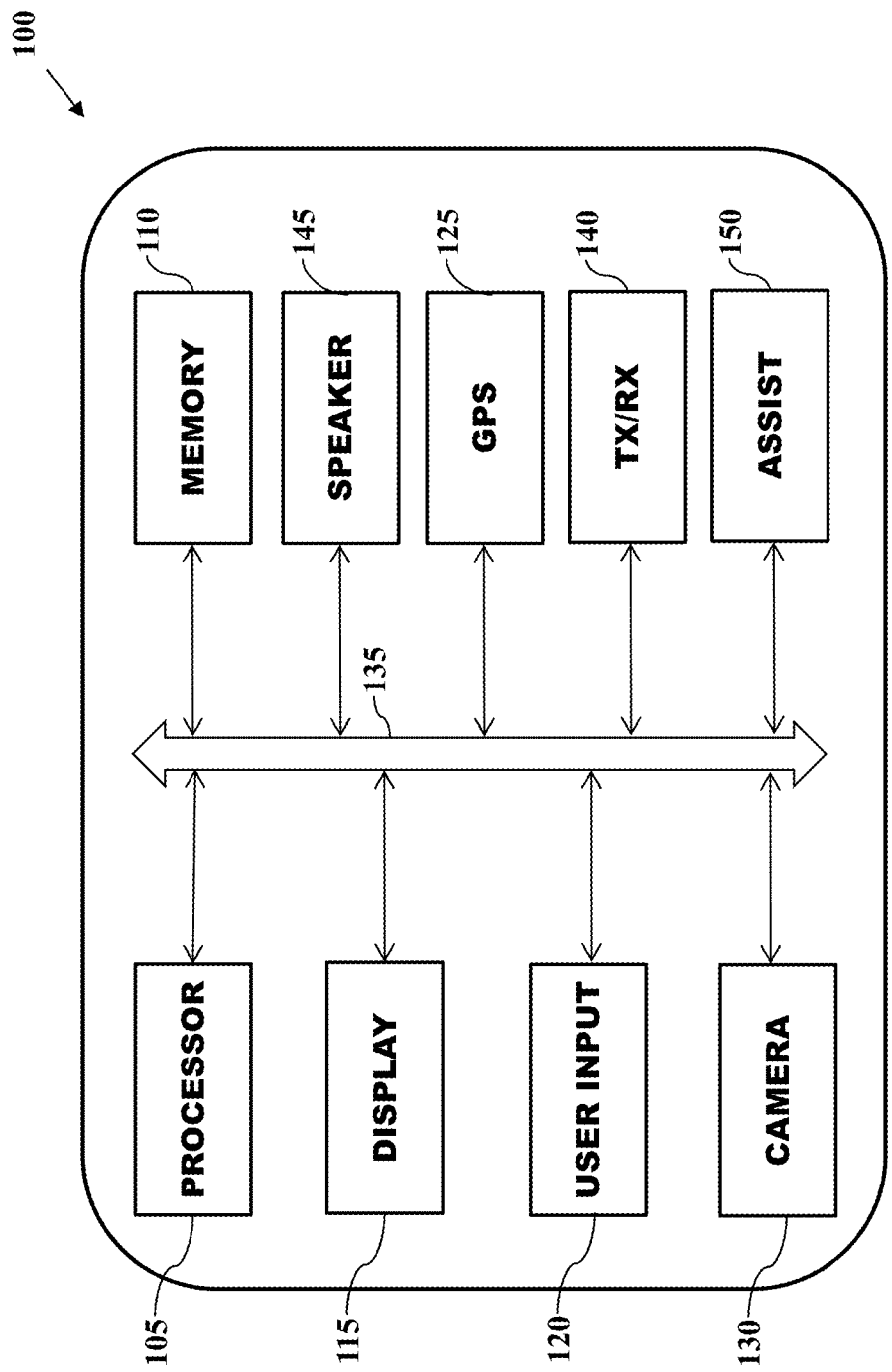
FIG. 1 is a block diagram illustrating an exemplary information processing subsystem in which one or more aspects of the invention may be implemented.

One aspect of the invention is to provide a system and method that capitalizes on improved modeling techniques to estimate vehicular movement, such as velocity, using real-time images captured by a single camera. In certain embodiments, the real-time camera captured images are analyzed by a convolutional neural network, which was pre-trained in accordance with the techniques described herein. To estimate vehicular movement, the invention is configured to recognize similar synchrony features in the captured images and, in accordance with such recognized features, to then encode the motion. The encoded motion features are then used to estimate vehicle movement, such as vehicle ego-motion/speed.

Another aspect of the invention is to output a parameter, corresponding to the estimated vehicle movement, to the driver or to a driver assistance system for use in controlling the vehicle. For example, a system may be particularly advantageous as a component of an autonomous driving system which predicts what velocity a vehicle has/should have at any given moment, i.e., now and/or in the near future. Such a system is also particularly advantageous as part of a vehicle stability control subsystem. For example, when a vehicle runs over a pothole, a back-wheel slip occurs and, due to vehicle vibrations, hardware sensors are unable to localize or provide accurate movement parameters for the vehicle. In such cases, the present invention may be used to estimate the pitch velocity of the vehicle, for example, and detect when such a back-wheel slip occurs and alert the driver and/or notify the driver to take over the manual control of the vehicle. Alternatively, a driver assistance system may be configured to perform one of a steering and an acceleration/deceleration operation at least partly based on the vehicle movement parameter.

As described in more detail below, certain aspects of the invention are based extending and on improving known modeling techniques, such as the synchrony autoencoder (SAE) model developed by Konda et al. in 'Learning to encode motion and using spatio-temporal synchrony, ICLR 2014. While the Konda et al. model, like most velocity models in the market, is based on stereo or multi camera motion feeds, one aspect of the invention is to extend this concept to single camera feeds. Another aspect of the invention is to use the CaffeNet model in a different, non-obvious scope than what is used in the prior art by manipulating the input to the CaffeNet in a new way to adjust for the current spatio-temporal task at hand. These innovations lead to improved precision and increase the speed at which the data can be processed, all while reducing the processing memory requirements.

As a result of the system and methods disclosed herein, new applications in resource constrained environments are now feasible. One such resource constrained environment is the data processing environment of a vehicle. For example, the innovative system and methods disclosed herein allow for a fast neural network to run at around 15 Hz on less powerful and less expensive platforms, such as the Jetson TX1 or TK1 produced by Nvidia, or the Snapdragon 810 and 820 processors produced by Qualcomm. This is in contrast to known means for performing visual odometry, which require much more powerful hardware to run at 15 Hz. For example, the famous VGG architecture would run at less than 1 Hz on the above mentioned hardware, provided it can fit in the memory at all. The recent winning architectures ResNet-152/101 would also perform at most at 3 Hz.

Again, the fact that the invention can be implemented using much less powerful hardware means that vehicle applications are now feasible since such hardware is relatively inexpensive and not difficult to maintain at an appropriate temperature. In addition, the invention can be implemented in a very small footprint (e.g., 4 MB), which allows for a fast distribution to multiple devices and updates over a wireless connection, which similarly makes the vehicle application for fleets now feasible. It has always been challenging to push model updates over a network to all the autonomous driving fleets and having a smaller footprint gives us that advantage.

One vehicle-based system configured to implement one or more aspects of the invention is shown in the simplified schematic of FIG. 1. As shown in FIG. 1, an information processing subsystem 100 configured to implement one or more aspects of the invention. Specifically, the system includes at least one processor 105, which may comprise a graphics processing unit ("GPU"), such as the Jetson TX1 or TK1 mentioned above. The system includes a memory 110, a touchscreen display 115 and a user input 120, each being interconnected by bus 135. The system 100 may also include GPS transceiver and related circuitry 125, a camera 130 and a radio frequency interface 140 that performs the function of transmitting and receiving radio frequency signals from one or more wireless networks (not shown). Finally, the system may comprise a speaker 145 for providing audio outputs. It should further be appreciated that system 100 may comprise additional components (e.g., processors, memories, etc.) which are generally known in the field of vehicle information processing.

With respect to the user input 120, it may be implemented using a keypad, such as a push-button dialing pad, a keyboard or the like. The touchscreen display 115 may be an LCD or any other type of display commonly used in consumer electronic devices. Since the display 115 is preferably touch-sensitive, it may serve the dual function of being a display screen as well as part of the user input 120. In a preferred embodiment, the information processing subsystem 100 may be incorporated into a vehicle. It should be appreciated that the display 115, user input 120 and speaker 145 may comprise at least a part of an audio/visual system of the vehicle.

Finally, the system 100 of FIG. 1 comprises a driver assistance system 150, which may include one or more of an adaptive cruise control (ACC), adaptive high beams system, automatic parking system, navigation system, automotive night vision system, blind spot monitor, collision avoidance system, driver drowsiness detection system, driver monitoring system, distance-based speed control system, lane departure warning system, lane change assistance, and the like.

Figure 2:
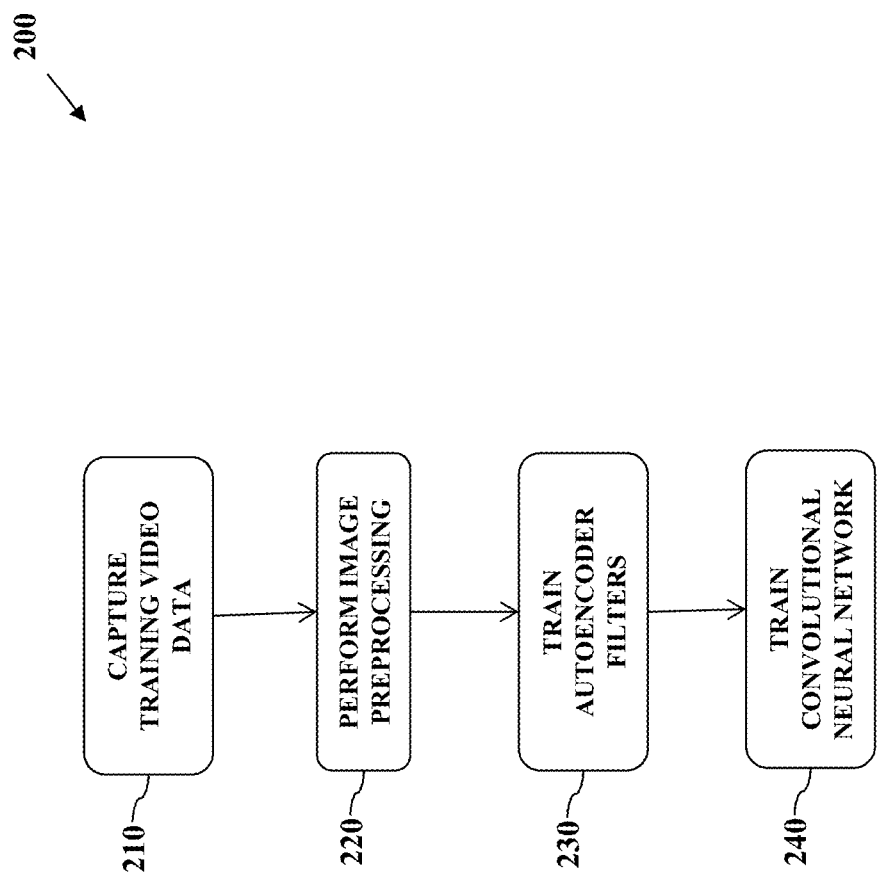
FIG. 2 is a flow diagram of various operations carried out in accordance with the principles of the invention.

With reference to FIG. 2, a process 200 for implementing one or more aspects of the invention will now be described. In certain embodiments, process 200 may be implemented using certain components of system 100, such as the GPU 105, memory 110 and camera 130. The basic idea was to encode paired pattern differences or similarities among Gabor filters. Essentially, the trained autoencoder learns the Gabor filter patterns while trying to recover its input (unsupervised learning). This process is a pre-training step and is not repeated during training or testing at real-time. However another CNN is trained with these generated feature filters to be able to estimate vehicle speed in real time.

Thus, one aspect of the invention is in using a mono camera feed while making sure the accuracy of the algorithms or the speed doesn't drop on captured, unlabeled video data. To that end, block 210 begins the process with the capturing of video training data using a single camera attached to a vehicle (e.g., to the front) in which the images are captured while the vehicle drives in a variety of settings (e.g., highways, side streets, urban settings, etc.) over a range of velocities (e.g., 0-70 mph). The captured video feed may be pre-processed at block 220, which is further described below. After pre-processing, the captured training video data may be provided to an SAE and used as a pre-training process to generate the learned Gabor filters (block 230). Thereafter, a first layer of a multi-layer convolutional neural network (CNN) may be initialized using the SAE-generated weights (block 240). In certain embodiments, the CNN may be a N-layer CNN, N being extendable to as many layers required based on use case complexity. It should further be appreciated that other architectures may be used for training the CNN (e.g., CaffeNet).

The Pre-processing operation of block 220 comprises ZCA-whitening the data used for SAE pre-training process. Such ZCA-whitening pre-processing may be performed after taking crops from the original frames in a sequence of some number of temporal sequential frames. Generally speaking, the raw image input is redundant, since adjacent pixel values are highly correlated. As a result of the ZCA-whitening, the inventors have achieved a reduction of this redundancy and thus the resultant features end up both less correlated and with the same variance. By way of example, 256 filters of size 16×16×5 pixels may be trained, where the dimensions span both the spatial and temporal directions. In other embodiments, the pre-processing may comprise batch-normalizing the data (without ZCA-whitening). It should further be appreciated that the pre-processing operation of block 220 may further comprise averaging some number of input frames to create "blur patterns." These patterns are a novel way to encode motion, since depending on the speed of an object and its distance from the camera it will appear more or less blurred if a number of frames it appears in are added together. When one or more of such averaged images are given to a CNN it can be trained to estimate the speed of a moving car by evaluating the degree of blur in the input frames.

To map the bridge between spatial and temporal elements of the images in a video stream, the measurement of synchrony between features undergoing the same motion is crucial. Pre-existing CNN models operate on stereo sequences of videos to create a depth map and determine velocity. However, when only a single camera feed is available, such as may be the case with certain vehicle applications, the inventors further innovated on top of the SAE approach by which a duplicate of the first channel can be provided as the second channel to do intra-sequence encodings rather than the usual inter-sequence encodings from 2 or more video feeds. This is used as a pre-training process for encoding Gabor patterns and then use only a single feed for the actual test phases.

One known way to detect synchrony is by allowing for multiplicative ("gating") interactions between filter responses rather than just using weighted sums as the only allowable type of module for encoding filters in a deep network. Multiplicative gating can be used to encode the similarity of patterns between the inputs. Specifically, a set of features at least partially present in both inputs can be identified and/or differentiated between them. This ability to detect similarly transformed features in both of the images is called synchrony.

With respect to the unsupervised learning process using a synchrony autoencoder, the autoencoder would take an input X, for example, and map it to a hidden representation, $$R = f\{\theta\} \cdot (\vec{X}) = s(\vec{W}\vec{X} + b).$$

parameterized by, $$\theta = \{\vec{W}, b\},$$

where notations hold their usual meanings.

The resulting latent representation R is then mapped back to a "reconstructed" vector $\vec{Z}$ in input space $$\vec{Z} = g\{\theta'\}(R) = s(\vec{W}'R + b').$$

The weight matrix W' can optionally be constrained such that $W' = W^T$, in which case the autoencoder is said to have tied weights. The network is trained to minimize the reconstruction error (the error between $\vec{X}$ and $\vec{Z}$). In the context of a dual input channel $\vec{X}$ and $\vec{Y}$ architecture, the filter responses are defined as $$\vec{F}_X = W_X \vec{X} \text{ and } \vec{F}_Y = W_Y \vec{Y}.$$

In addition, denoising may be used where the inputs are corrupted with a standard noise model and the autoencoder is forced to reconstruct the output from partially visible input sequences. The encoding employs both a Sigmoid weight decay and a multiplicative gating of the dual channel:

$$H_q = \left(1 + e^{-(\vec{F}_X * \vec{F}_Y)}\right)^{-1} = \sigma(F_q^x * F_q^y),$$

where * symbolizes elementwise multiplication.

On the decoding side the reconstructions of the inputs are given by $$\hat{\vec{X}} = W_x^T (\vec{H} * \vec{F}_X)$$

$$\hat{\vec{Y}} = W_y^T (\vec{H} * \vec{F}_Y).$$

Continuing to refer to the operations of FIG. 2, the SAE model may be trained on local video block pairs where both the channels are identical and have a given size of (e.g., 16×16×5 (space×space×time)) pixels cropped randomly from the training sequences. As noted above, the training samples may be ZCA-whitened. A predetermined number (e.g., 256) of such filter pairs are then used to encode motion using unsupervised learning from the sequence data. To our knowledge this study to encode Intra-sequence pattern has not been done before so mono camera solution are not mainstream in the market. Our innovation not only studies this but adapts the network to achieve competitive results with a huge boost in speed of detection than other heavy-weight networks in the market or off-the-shelf. To minimize the reconstruction error, the standard sum of squared errors [15] is computed by:

$$L\left((\vec{X}, \vec{Y}), (\hat{\vec{X}}, \hat{\vec{Y}})\right) = \|(X - \hat{X})\|^2 + \|(Y - \hat{Y})\|^2,$$

where $\hat{\vec{X}}, \hat{\vec{Y}}$ are the reconstructed outputs of the SAE and L denotes the L2 loss function.

The weights are updated with stochastic gradient descent with various batch size settings starting from 256 during the initial phase of training to a batch-size of one in advanced stages.

Because of the presence of multiplicative interactions in the encoder, the reconstruction error is conditioned on one input, given the other. However, once the filter has learned this dependence, the inventors have discovered that the CNN model initialized with the filters learns to correctly identify the patterns, even if there is no second channel of data.

Figure 3:
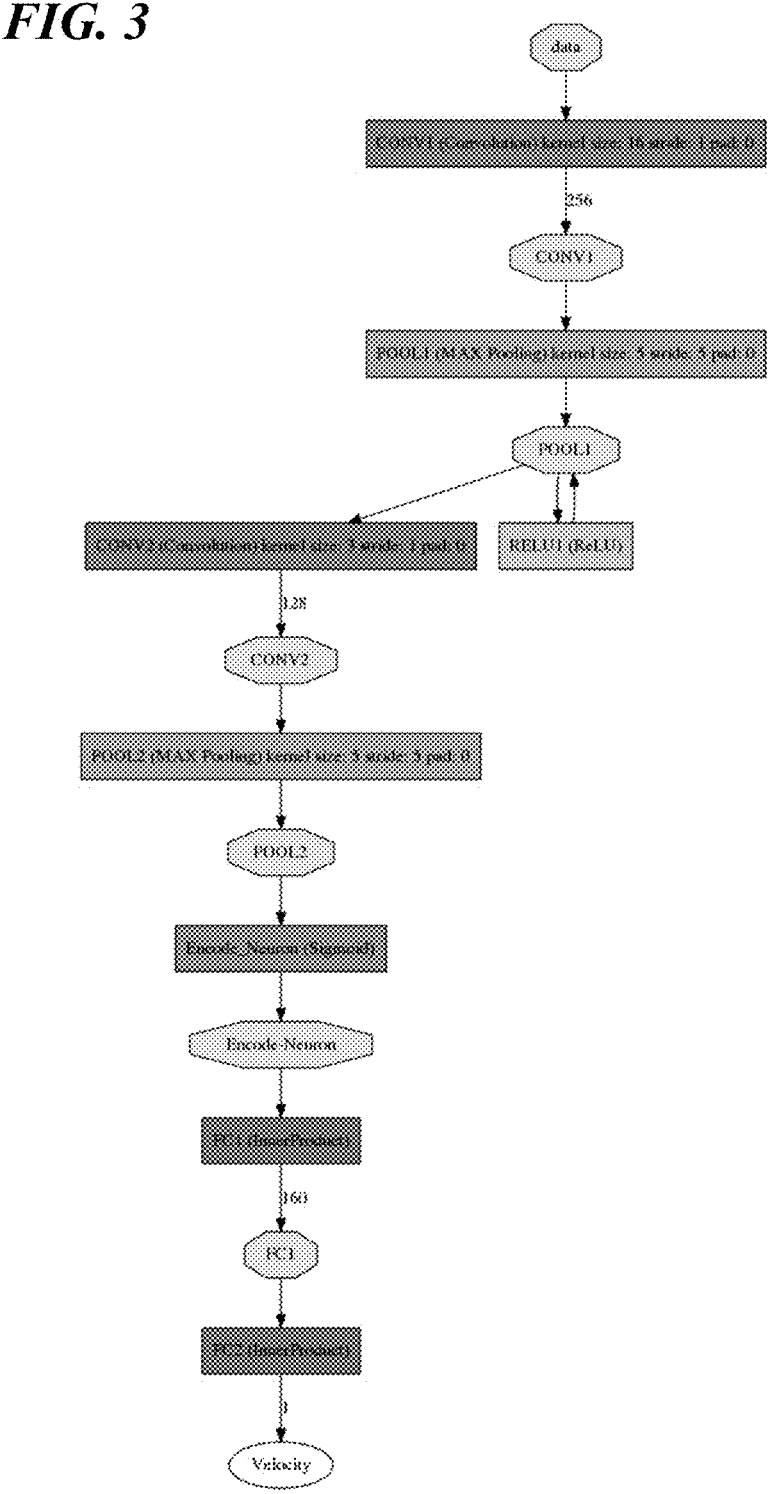
FIG. 3 is a graphical representation of one embodiment of a convolutional neural network training architecture configured in accordance with the invention.

FIG. 3 is a graphical representation of one embodiment of a convolutional neural network training architecture configured in accordance with the invention. In the context of a monocular video feed, the inventors discovered that this architecture does not need a duplicate input channel (which was used when training the SAE), because discarding it surprisingly resulted in the single channel network of FIG. 3 which outperformed a dual channel network (from Konda et al.), both in terms of speed and accuracy.

As mentioned above, the filters of the first convolutional layer(s) of networks are initialized with features obtained from unsupervised learning of the SAE. By way of example, the input data are converted into grayscale and the CNN trained using either a higher-resolution input (e.g., 500×300 pixels) or a lower-resolution (150×150 pixels). A batch normalization on a batch of samples (e.g., 256) during the initial phase of training may be performed, and a truncated ReLU after the gating operation may be used in certain embodiments until the loss decreases to a plateau at which point the ReLU may be replaced with a sigmoid and switched to a batch-size of one and normalize the data globally to minimize the network error. A root-mean-square error (RMSE) as low as 5 mph may then be achieved.

Generally speaking, batch normalization accelerates the entire process of training a deep neural network. In a deep network, there is an input layer, followed by several hidden layers and finally the output layer. The process of training consist of each layer's output being passed to the next layer, and requires that the learning rate and other parameters, such as momentum, be revised iteratively in order to prevent the slowing down of the training process. As such, it may be preferable to use batch normalization as it has been found to allow the learning rate to remain higher and thus the training process is faster. It should further be appreciated that batch normalization, along with local response normalization, may also be used in certain embodiments for improved results.

The filters learned by the SAE using ZCA-whitened input are used to initialize the first layer(s) of the CNN, as shown in the architecture of FIG. 3. The output of the first layer of the CNN can be interpreted as a combined representation of local motion from the two input channels. The rest of the CNN relates the local representations to the desired label (change in ego-motion/speed). This can be easily extended to odometry and direction. FIG. 3 depicts the architecture of the CNN which performed fastest and most precisely with respect to estimating the vehicle ego-speed. It was trained on video frames for each of which the speed of the car is known. During training, each layer of the CNN performs a particular numeric transformation on its input (often this is a multiplication by matrices of weights) and passes its output to the next layer. The last layer compares its output to the known speed of the car and propagates back the information of how big the discrepancy is between the speed prediction and the ground truth. Depending on how big this difference is, the previous layers adjust their weights in order to minimize it. Such forward-backward passes of information are repeated hundreds of thousand times or more until a desired performance is achieved. Once the CNN is fully trained, its regular operation consists of only a forward pass on the video input and the output of the last layer is the predicted vehicle ego-speed.

Figure 4:
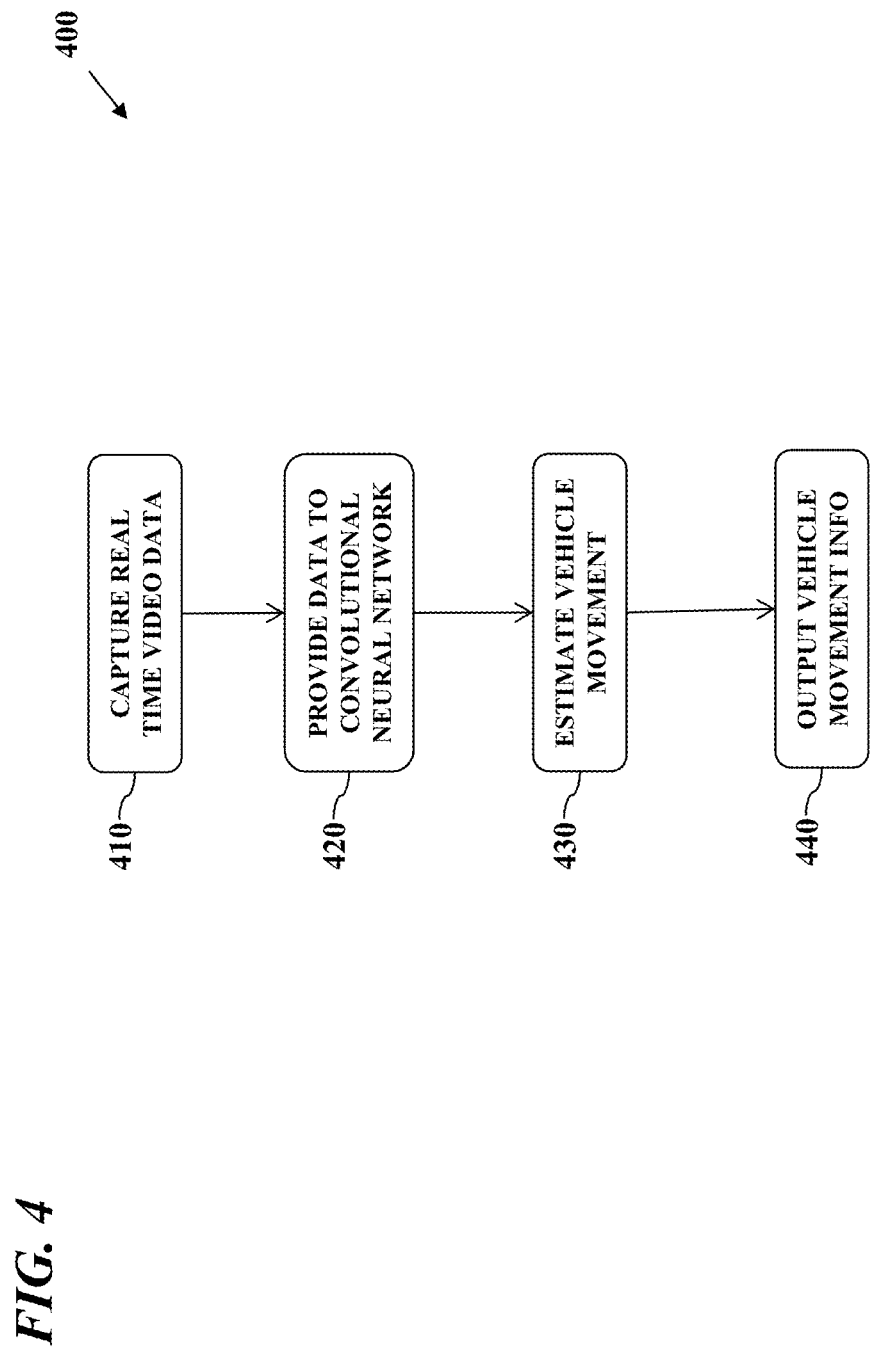
FIG. 4 is another flow diagram of various operations carried out by the information processing subsystem of FIG. 1, in accordance with the principles of the invention.

FIG. 4 depicts a diagram of various operations carried out by one or more components of the information processing subsystem 100 of FIG. 1, such as the GPU 105, memory 110 and camera 130. Specifically, process 400 begins at block 410 with real-time video data being captured by a monocular camera (e.g., camera 130) attached to the a vehicle that is in motion. At block 420, the captured real-time video data may then be provided to a convolutional neural network that was previously trained in accordance with the process 200 of FIG. 2 described above.

Process 400 then continues to block 430 where a vehicle movement parameter (e.g., vehicle velocity) may be estimated by the trained CNN. The filters in this CNN has been pre-trained using sequential patches of car drives around several different neighborhood for it to understand and encode the motion blur and synchrony between consecutive frames. This helps the CNN to inference the speed recorded in each frame or sequence of frame. The ground truth for speed was provided from the car IMU. While in one embodiment the vehicle movement parameter to be estimated may be the vehicle's speed, in other embodiments the vehicle movement parameter to be estimated may include pitch velocity and general visual odometry.

The vehicle movement parameter that was estimated by the trained convolutional neural network may then be output at block 440 by the information processing subsystem an audio/visual component/system of the vehicle (e.g., display 115, speaker 145, etc.) or to a driver assistance system of the vehicle (e.g., driver assistance system 150). As noted above, the vehicle movement parameter may be provided to an autonomous driving system which predicts what the vehicle velocity is/should be at any given moment and/or to a vehicle stability control subsystem when, for example, environmental factors cause traditional sensors to be inaccurate.

Alternatively, a driver assistance system may be configured to perform one of a steering and an acceleration/deceleration operation at least partly based on the vehicle movement parameter. In one embodiment, this case be done by detecting mechanical slip of the wheels when running through potholes or other road surface defects. The sensors temporarily cease to function properly due to the impact. However it give out garbage data which results in a silent error and wrong detection and erroneous actuation of the car. This method is being implemented to accurately detect the event of occurrence of the back wheel slip and send out a warning over the ADAS. Another use case for detection of all 6 degrees of motion is being under-studied for health check of all sensors surrounding the car and building the motion estimates for ego-localization and odometry mapping.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment", "certain embodiments", "an embodiment" or similar term means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner without limitation.

In accordance with the practices of persons skilled in the art of computer programming, the invention is described below with reference to operations that are performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits.

When implemented in software, the elements of the invention are essentially the code segments to perform the necessary tasks. The code segments can be stored in a processor readable medium or transmitted by a computer data signal. The "processor readable medium" may include any medium that can store information. Examples of the processor readable medium include an electronic circuit, a semiconductor memory device, a ROM, a flash memory or other non-volatile memory, a floppy diskette, a CD-ROM, an optical disk, a hard disk, etc.

While the invention has been described in connection with various embodiments, it should be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A system for estimating vehicular speed based on monocular video data by encoding spatio-temporal motion features, the system comprising:
    a camera mounted to a vehicle and configured to capture monocular video data;
    a memory configured to store data and processor-executable instructions;
    a processor configured to execute the processor-executable instructions stored in the memory to:
        receive, from the camera, pre-training video data captured while the vehicle is in motion,
        train one or more filters of a synchrony autoencoder using the pre-training video data, and
        pre-train a convolutional neural network using the trained one or more filters from the synchrony autoencoder,
        following said pre-training of the convolutional neural network, the processor is further configured to
            receive real-time video data from the camera while the vehicle is in motion,
            provide the real-time video data to the pre-trained convolutional neural network,
            receive an estimated vehicle movement parameter from the pre-trained convolutional neural network, and
            output the estimated vehicle movement parameter to at least one of an audio/visual system and a driver assistance system of the vehicle wherein the driver assistance system is configured to perform one of a steering and an acceleration/deceleration operation at least partly based on the vehicle movement parameter.

2. The system of claim 1, wherein the processor is further configured to pre-process the pre-training video data by ZCA-whitening prior to training the one or more filters of the synchrony autoencoder.

3. The system of claim 1, wherein the processor is configured to pre-train the convolutional neural network by initializing a first layer of the convolutional neural network using the trained one or more filters from the synchrony autoencoder.

4. The system of claim 3, wherein the convolutional neural network is further trained, in an iterative fashion, in which an output of the first layer is passed to a next layer of the convolutional neural network which, in turn passes a corresponding output to another layer of the convolutional neural network.

5. The system of claim 1, wherein the processor is configured to duplicate a first channel of the pre-training video data as a second channel of pre-training video data, wherein the first and second channels of pre-training video data are provided to train the one or more filters of the synchrony autoencoder.

6. The system of claim 1, wherein the vehicle movement parameter comprises an ego-speed of the vehicle.

7. A method for estimating vehicular speed based on monocular video data by encoding spatio-temporal motion features, the method comprising:
    pre-training a convolutional neural network, wherein said pre-training comprises:
        receiving, from a mono-camera mounted to a vehicle, pre-training video data captured while the vehicle was in motion;
        training one or more filters of a synchrony autoencoder, stored in a vehicle memory, using the pre-training video data;
        pre-training the convolutional neural network, stored in the vehicle memory, using the trained one or more filters from the synchrony autoencoder,
    wherein following said pre-training of the convolutional neural network, the method further comprises
    receiving real-time video data from the camera while the vehicle is in motion;
    providing the real-time video data to the pre-trained convolutional neural network;
    receiving an estimated vehicle movement parameter from the pre-trained convolutional neural network;
    outputting the estimated vehicle movement parameter to at least one of an audio/visual system and a driver assistance system of the vehicle and performing, by a driver assistance system of the vehicle, one of a steering and an acceleration/deceleration operation at least partly based on the vehicle movement parameter.

8. The method of claim 7, further comprising pre-processing the pre-training video data by ZCA-whitening prior to said training of the one or more filters of the synchrony autoencoder.

9. The method of claim 7, wherein pre-training the convolutional neural network comprises pre-training the convolutional neural network by initializing a first layer of the convolutional neural network using the trained one or more filters from the synchrony autoencoder.

10. The method of claim 7, further comprising duplicating a first channel of the pre-training video data as a second channel of pre-training video data, wherein the first and second channels of pre-training video data are provided to train the one or more filters of the synchrony autoencoder.

11. The method of claim 7, wherein the vehicle movement parameter comprises an ego-speed of the vehicle.

* * * * *